United States Patent [19]
Wahl

[11] 3,821,524
[45] June 28, 1974

[54] DIGITAL ELECTRONIC APPROXIMATIVE FUNCTION TRACING METHOD AND APPARATUS

[75] Inventor: Karl-Heinz Wahl, Stuttgart, Germany

[73] Assignee: Robert Bosch GmbH, Stuttgart, Germany

[22] Filed: Dec. 7, 1972

[21] Appl. No.: 313,150

[30] Foreign Application Priority Data

Jan. 14, 1972 Germany ............................ 2201690

[52] U.S. Cl. .................. 235/151, 235/152, 235/197
[51] Int. Cl. ............................................ G06f 15/46
[58] Field of Search ...... 235/197, 152, 151, 151.11, 235/92 CP, 92 MP, 92 CA; 318/600, 601, 603, 573, 685, 696

[56] References Cited

UNITED STATES PATENTS

| | | | |
|---|---|---|---|
| 3,247,365 | 4/1966 | Dell et al. | 235/152 X |
| 3,372,268 | 3/1968 | Hoernes | 235/152 X |
| 3,373,273 | 3/1968 | Schubert | 235/150.53 X |
| 3,412,240 | 12/1968 | Hunt et al. | 235/197 X |
| 3,668,500 | 6/1972 | Kosem | 318/603 X |

*Primary Examiner*—Joseph F. Ruggiero
*Attorney, Agent, or Firm*—Flynn & Frishauf; William R. Woodward

[57] ABSTRACT

Stepping pulses advance a counter for each co-ordinate simultaneously, but in each case only so long as the output of a simultaneously stepped auxiliary counter does not equal or exceed the incremental value for that co-ordinate, as furnished by storage device, between two successive given points of the function. The counters may be started at the initial point of the function. When counting in all co-ordinates is complete, the auxiliary counter is reset.

Scaling circuits ahead of the counters reduce the number of counts to one out of n, while another scaling circuit with the same factor allows the auxiliary counter to be reset n times before the storage devices are advanced to provide information on the next linear segment of the given function. The result is a trace approximating the function which coincides with the line having two successive given points at $n-1$ evenly spaced intermediate points regardless of the slope of the line.

11 Claims, 4 Drawing Figures

DIGITAL ELECTRONIC APPROXIMATIVE FUNCTION TRACING METHOD AND APPARATUS

This invention relates to methods and apparatus for tracing the course of a function of two or more variables for which two or more particular points are given in terms of coordinate values of the variables. More particularly the invention relates to tracing the course of such a function by piecemeal linear approximation.

Such methods and apparatus in practice generally involve functions of two variables, but are generally extensible to similar dealings in functions of three, four or more variables. For convenience and clarity, accordingly, illustrations and explanations will be given in terms of functions of two variables, with only occasional reference to cases where more variables may be involved.

Methods and apparatus of function tracing are known in which the function is represented by biased diodes. The slope of the straight line connecting two points $x_i,y_i$ is first usually determined. Each time the points $x_i,y_i$ are changed in going from one segment of the function to another, the slope of the straight connecting line from the new initial point to the next point must be determined anew and set into the operation. This procedure is in many cases too complicated and too time consuming. Since the method and the appropriate apparatus therefor is commonly installed in workshops and manufacturing plants that are manned by operators not specialized or trained in the principles of these methods, an exact setting of the desired function or of the particular segment of the curve is not always performed.

An object of the invention is to provide a method and appropriate apparatus to trace the course of the desired function simply and as accurately as possible and in such a way as to eliminate largely the likelihood of errors in setting in the given values of the function. In particular it is an object of the invention to provide a method and apparatus for the tracing of the course of a function of two or more variables without first determining the slope of a segment of the function between two given points prior to tracing out the course of the function over that segment to a close approximation.

Subject matter of the present invention

Briefly, stepping pulses are caused to advance a pulse counter for each variable and also an auxiliary counter, the output of which is furnished to a comparator for each variable. During the tracing of each segment the comparators are provided with the respective coordinate differences between the next given point of the curve and the likewise given initial point of the segment. Each comparator controls a gate through which the stepping pulses must pass to reach the corresponding coordinate pulse counter and holds that gate open so long as the output of the auxiliary counter is less than the given information furnished to the comparator. Thereafter that particular gate is closed and the corresponding coordinate pulse counter stops advancing. Storage devices, one for each coordinate variable, furnish the given information to the respective comparators and are so designed as to provide to the comparators the necessary information for the next segment as soon as an AND gate has found that the output of the auxiliary counter has matched or exceeded the given information provided to all of the comparators (i.e., a match has been reached or passed in all of the comparators). The storage devices may supplied with information from a common card reader the advance of which to the next segment in effect advances all the storage devices. The all-match signal that advances the storage devices also resets the auxiliary counter and the individual pulse counters associated with the respective variables.

In order that the course of the function may be traced to a reasonably close approximation even when the increments of the respective variables between two given points are quite unequal it is important to provide a scaling operation, such as is provided by a scale of ten divider, for example, so that only one out of some fixed number of pulses, 10 in the case of a scale of 10 circuit, passing through the gates controlled by the comparators actuates the respective pulse counters. A similar scaling operation with the same scale factor is inserted in the input of the storage device advancing circuit, so that only one out of the same number of all-match signals from the aforesaid AND gate is permitted to advance the storage devices. Each individual all-match signal, however, still resets the auxiliary counter. Each operation of the auxiliary counter then provides a reduced-scale approximation of the function over a subsequent of the function and terminates at a point on the function segment itself (the coordinate of such point then being indicated by the coordinate counters). The aforesaid AND gate may hence be called the subsequent gate.

The invention will be described by way of example with reference to the accompanying drawings, wherein.

Figure 1:
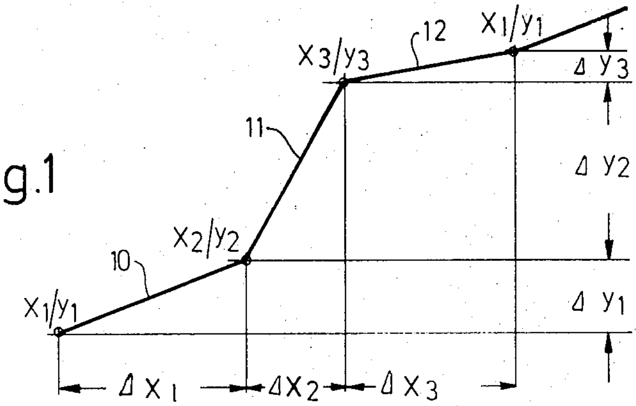
FIG. 1 shows a function made up of linear segments.

FIG. 1 shows a portion of a function which is composed of a succession of segments 10,11 and 12 which run between points having the coordinates $x_1,y_1$; $x_2,y_2$;$x_3$;$y_3$; and $x_4$;$y_4$. The individual straight segments between the points $x_1,y_1$ and $x_2,y_2$ and so on can be identified by giving the coordinate increment values $\Delta x$ and $\Delta y$ which are the differences in the respective $x$ and $y$ values of successive points, as is readily seen in FIG. 1.

Figures 2, 3:
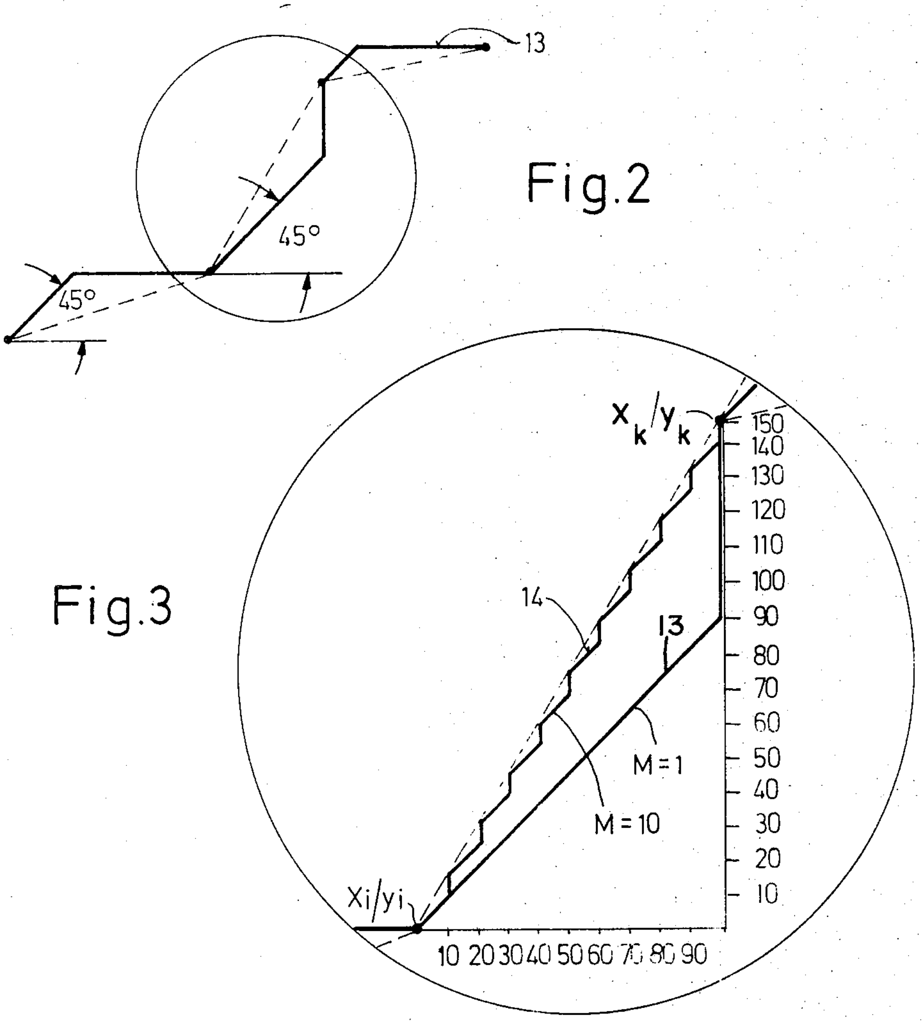
FIG. 2 shows the composite segmented function of FIG. 1 and a constructed approximation thereof.
FIG. 3 is an enlarged section of FIG. 2.

In FIG. 2 the same function is shown in dashed lines. The approximative construction of this function is given by the heavy solid line 13. The curve 13 is likewise a composite of straight segments. FIG. 3 is an enlarged representation of a portion of the function to be traced and the approximation obtained.

In FIG. 3 the function itself is shown in dashed lines and the original approximation curve between the points $x_i,y_i$ and $x_k,y_k$ is shown by the solid line 13. The small zigzags of the line 14 are reduced scale replicas of the function approximation 13. It may thus be recognized that by reduction of the scale of the approximation curve while preserving the configuration and by repetition of the reduced curve configuration by the corresponding scale factor, a greatly more accurate tracing of the course of the function is made possible.

Figure 4:
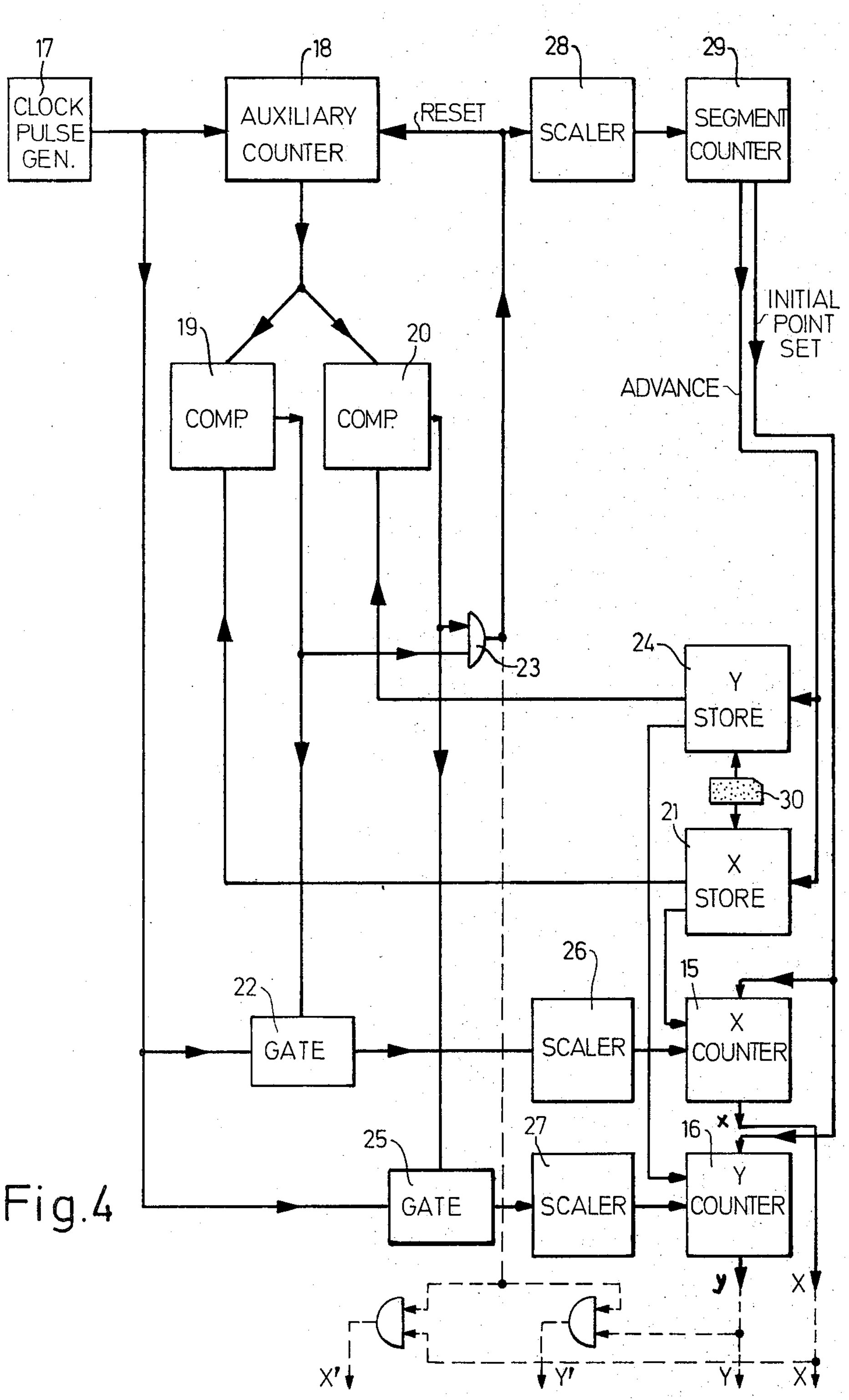
FIG. 4 is a block diagram of the circuit of an apparatus for tracing the course of functions.

FIG. 4 shows a block diagram of the circuit of an apparatus for tracing the course of a function in accordance with the invention. This equipment has a first pulse counter 15 hereafter referred to as the $x$ counter, and a second pulse counter 16 hereafter referred to as the $y$ counter. At the beginning of the operation for this particular segment the outputs of counters 15 and 16, as further explained below, show the values $x_i$ and $y_i$ respectively. Pulse counters 15 and 16 are then further actuated by stepping pulses produced by a pulse generator 17. For the purposes of this circuit pulse generator 17 may be referred to as a "clock" and the stepping pulses as clock pulses, even though it is not important for the time interval between pulses to be equal. The pulses which advance counters 15 and 16 are also furnished to an auxiliary counter 18 which has been reset to zero at the beginning of the tracing of the particular segment. The output of this counter is furnished to a comparator 19 and a second comparator 20. This connection is shown by a single branched line in the block diagram of FIG. 4, but of course this represents all the necessary connections for transferring the results of the counting operation from the counter to the comparators. The comparators 19 and 20 are respectively connected to storage devices 21 and 24 which respectively provide the $\Delta x$ and $\Delta y$ values for the particular segment being approximately traced. The outputs of comparators 19 and 20 are respectively connected to gates 22 and 25 which in turn are respectively interposed in the supply of stepping pulses to the pulse counters 15 and 16. These connections of the comparator outputs are such as to close the respective gates when the output of auxiliary counter 18 has reached the values provided by the respective storage devices 21 and 24.

The outputs of comparators 19 and 20 are also connected to an AND gate 23 which may be referred to as the line segment gate. Between gate 22 and counter 15 and between gate 25 and counter 16 are respectively located scalers 26 and 27 which are scale circuits such as those commonly used in frequency dividers that allow only the $n$th inpulse pulse to be represented in the output, $n$ being the scale factor. The output of AND gate 23 is connected directly to the reset connection of counter 18 and through a scaler 28 with the same scale factor as scalers 26 and 27 to the segment counter 29. The latter is connected with the storage devices 21 and 24 and with counters 15 and 16 for the purposes we have stated in the description of the operation of the circuit of FIG. 4 which is now to be described.

As already explained, the $x$ and $y$ counters 15,16 are initially set with the coordinates of a first point of the function then are advanced so as to represent a sequence of adjacent points of the function as approximated, passing of course through all the given points. Beginning with a given initial point setting, these two counters are advanced together, while at the same time the auxiliary counter 18 is advanced and provides the output to the comparators 19 and 20, which compare the output register of the auxiliary counter with the $\Delta x$ and $\Delta y$ values for the segment in question as presented by storage devices 21 and 24 respectively.

In FIG. 3, for example, $\Delta x = 100$ and $\Delta y = 150$. When the output register of auxiliary counter 18 reaches the number 100, comparator 19 recognizes the equality of the counter output and the $\Delta x$ value provided by storage device 21 and closes the gate 22 which up to then had been open, thus bringing the operation of $x$ counter 15 to a halt. The auxiliary counter 18 keeps operating and of course the gate 22 now remains closed. And when its output registers 150, which corresponds to the value stored in storage device 24 for $\Delta y$, the gate 25 is closed and the advance of $y$ counter 16 is brought to a stop. The coordinate value $x_k, y_k$ according to FIG. 3 now appears at the outputs of $x$ counter 15 and $y$ counter 16. This coordinate value can, for example, be traced by a graphic or indicating measuring instrument.

When the last of the gates (gate 25) is closed, the signal also appears at the output of AND gate 23, the line segment gate. This signal serves to reset the auxiliary counter to zero so that another count up to the $\Delta x$ and $\Delta y$ values provided by storage devices 22 and 24 can proceed. In our example relating to FIG. 3, with $\Delta x$ 100 and $\Delta y$ 150, we have assumed that scalers 26,27 and 28 were not in a circuit and, of course, in this case, the output of segment gate 23 will be caused to advance storage devices 21 and 24 so that they can present new $\Delta x$ and $\Delta y$ values for the next segment defined by the given values of the function. The advance of storage devices 21 and 24, as shown in the illustration given in FIG. 4, is accomplished by segment counter 29, which is adapted to cause storage devices 21 and 24 to provide to comparators 19 and 20, respectively, the $\Delta x$ and $\Delta y$ information for the next segment by instructing them, or a card reader (not shown) common to the storage devices, to read additional information form a card 30 on which there has been punched beforehand the given information for the function being traced. The segment counter 29 is also adapted to reset counters 15 and 16 to zero before the beginning of the entire operation, so that coordinates of the initial point of the function may then be set in (as by a connection between the respective storage devices and the respective counters) before stepping pulses are provided to advance the counters 15 and 16 to trace the course of the function.

As already mentioned, the accuracy of the tracing of the function can be increased by the provision of the scalers 26,27 and 28 respectively ahead of the $x$ and $y$ counters 15 and 16 and the segment counter 29. Assuming a scale factor of 10, the $x$ counter 15 and the $y$ counter 16 will then be advanced only by every 10th stepping pulse. The segment counter 29, furthermore, will be advanced only when every 10th output signal appears at the output of AND gate 23. The auxiliary counter 18, however, will be reset with every output signal of AND gate 23. In this manner the course of successive elementary points traced by counters 15 and 16 for each operation of auxiliary counter 18 will be a reduced scale image of the original approximation shown by the solid line 13 of FIG. 3. If now the operation described is repeated 10 times, until the 10th output signal of AND gate 23 causes scaler 28 to advance segment counter 29, the resultant tracing of the function will correspond to the solid line 14. As shown in FIG. 3, this approximation of the dashed line representing the function being traced includes a multiplicity of new points on the dashed line which, if desired, could be separately recorded or indicated by the circuit shown in dashed lines in FIG. 4, leading to the outputs $x'$ and $y'$. Each of these points corresponds to an operation of AND gate 23.

In an oscilloscope presentation of the function (by means not shown) these points may be selectively brightened by a circuit responsive to operation of AND gate 23.

As mentioned before, the tenth operation of AND gate 23 advances path segment counter 29 which then causes storage devices 21 and 24 to provide new values of $\Delta x$ and $\Delta y$ to the comparators 19 and 20 respectively. The resolution of the function curve and the accuracy of its electrical tracing increases with increasing size of the scaling factor.

After the last straight segment of the curve to be traced has been completed, all counters may be returned to zero by a signal from segment counter 29 and the curve again run through from the beginning.

In a further extension of the invention, provision can be made for successively tracing various curves. In this fashion it is possible to trace families of curves or tolerance limits.

It is further possible to transform the values provided by $x$ counter 15 and $y$ counter 16 into analog forms by means of digital to analog converters. Values of particular relation to the function, for example the given values for tolerance curves, can then be inserted without error from time to time into the function on the digital side. If the curve is run through more frequently than about 16 times per second, it can then be displayed on an oscilloscope serving as an indicating device as in the form of an apparently standing image. The repetition rate at which the curve is repeatedly run through can be determined by the frequency of operation of pulse generator 17.

With the apparatus as described, a digital comparison between the various digital values, for example tolerances, can be simply accomplished.

For that purpose a design curve may be traced and compared with actual values to determine whether deviations of a specimen are within tolerance. When the two $x$ values agree, the corresponding $y$ design value can be taken from the $y$ counter 16 and compared with the corresponding $y$ actual value.

In a convenient further extension of the invention, functions with negative slopes or functions in more than one quadrant can be traced. For this purpose, either $x$ counter 15, $y$ counter 16, or both may be provided in a form capable of being stepped either forward or backward, with the direction of counting being determined by a connection of each counter to a "sign" output of the corresponding storage device.

As previously mentioned, the invention can also be extended to functions in three or more dimensions, that is, functions with three or more variables.

I claim:

1. A method of electrically tracing the course of a function of a plurality of variables by piecemeal linear approximations comprising the steps of:

advancing a plurality of coordinate pulse counters (15, 16), corresponding in number to the number of said variables, by a first succession of stepping pulses:

simultaneously with the advancing of said coordinate pulse counters advancing an auxiliary counter (18) with a succession of stepping pulses including all the stepping pulses of said first succession;

comparing the accumulated values produced by successive operations of said auxiliary counter in a corresponding plurality of comparators (19, 20) with given information in terms of the respective aforesaid variables regarding the increments of said function between two given points of said function defining a segment thereof;

interrupting the advance of each of said coordinate pulse counters (15, 16) when the corresponding comparator (19, 20) finds a match; and interrupting said auxiliary counter (18) when all of said comparators (19, 20) have found a match.

2. A method as defined in claim 1 in which the pulses supplied to the respective coordinate pulse counters are subjected to a scaling operation so that only one out of every so many of them, in a predetermined proportion, advance the counter, in which further said auxiliary counter is reset when interrupted as aforesaid and the counting of stepping pulses as aforesaid is thereafter continued, and in which the auxiliary counter resetting pulses, after being correspondingly scaled are used to change the given information in said comparators or to end the counting.

3. A method as defined in claim 2 in which said given information is supplied to a corresponding plurality of storage devices (21,24) relating to the respective variables which are adapted to be advanced by electrical signals to progress from the coordinate increment values from one segment of said function to the coordinate increment values from a succeeding segment of said function and in which, when said auxiliary counter has been reset as many times as the scale factor number of said scalers, each of said storage devices is advanced as aforesaid.

4. A method as defined in claim 3 in which a segment counter is used to advance information in said storage devices.

5. A method as defined in claim 3 in which said coordinate pulse counters are advanced forward or backward according to sense (sign) information taken from said storage devices.

6. A method as defined in claim 2 in which the outputs of said coordinate pulse counters existing at the time of the resetting of said auxiliary counter are selectively recorded or indicated.

7. A linear digital function tracer circuit for tracing the course of a function of a plurality of variables, said circuit comprising:

a stepping pulse generator (17);

an auxiliary counter (18) so connected as to be advanced by said stepping pulse generator and having a singlevalued output;

a plurality of comparators (19, 20), corresponding in number to the number of said variables, each arranged to be supplied with the output of said auxiliary counter and to compare the same with given data regarding the difference in terms of the respective variables between two points of said function defining a segment thereof and also to provide a signal which has one state when the output of said counter is less than said given data and another signal when the output of said counter is equal to or greater than said given data;

a plurality of gates (22, 25), corresponding in number to the number of said variables, each supplied at an input thereof with the output of said stepping pulse generator and each connected to the output of a different one of said comparators in such a way that stepping pulses appear at the outputs of each of said gates only while the given data in the corresponding comparator exceeds the output of said auxiliary counter;

a plurality of coordinate pulse counters (15, 16) corresponding in number to the number of said variables, adapted to count all or a fixed proportion of stepping pulses appearing at the output of said respective gates (22, 25);

and a line segment gate adapted to produce a signal as soon as the output of said auxiliary counter exceeds the given data in all of said comparators, the output of said line segment gate being connected so that said signal causes said auxiliary counter (18) to be reset to a reset value that is the same reset value every time.

8. A linear digital function tracer circuit for tracing the course of a function of a plurality of variables, said circuit comprising:

a stepping pulse generator (17);

an auxiliary counter (18) so connected as to be advanced by said stepping pulse generator;

a plurality of comparators (19, 20), corresponding in number to the number of said variables, each arranged to be supplied with the output of said auxiliary counter and to compare the same with given data regarding the difference in terms of the respective variables between two points of said function defining a segment thereof and also to provide a signal which has one state when the output of said counter is less than said given data and another signal when the output of said counter is equal to or greater than said given data;

a plurality of gates (22, 25), corresponding in number to the number of said variables, each supplied at an input thereof with the output of said stepping pulse generator and each connected to the output of a different one of said comparators in such a way that stepping pulses appear at the outputs of each of said gates only while the given data in the corresponding comparator exceeds the output of said auxiliary counter;

a plurality of coordinate pulse counters (15, 16) corresponding in number to the number of said variables, adapted to count all or a fixed proportion of stepping pulses appearing at the output of said respective gates (22, 25);

a plurality of scalers (26, 27), corresponding in number to the number of said variables, interposed respectively between said gates (22, 25) and said coordinate pulse counters (15, 16) and so constituted that a stepping pulse is provided by each scaler from the corresponding gate to the corresponding counter only after a predetermined number of stepping pulses have been absorbed in said scaler, said predetermined number being the same for all scalers; and a line segement gate adapted to produce a signal as soon as the output of said auxiliary counter exceeds the given data in all of said comparators, the output of said line segment gate being connected so that said signal causes said auxiliary counter (18) to be reset.

9. A function tracer circuit as defined in claim 7 in which a plurality of storage devices (21,24), corresponding in number to the number of said variables, are provided for storing given information regarding points of said function with respect to said variables and are arranged to supply respectively to said comparators the differences in terms of the respective variables between given information regarding two successive points of said function, and are further adapted to be advanced to supply such differences to said comparators for successive function segments defined by points for which the given information is supplied to said storage devices;

and in which means are provided for changing said given data in said comparators to the corresponding data for a succeeding segment of said function in response to each or to a fixed proportion of all of said signals produced by said line segment gate, according whether all or the same fixed proportion of stepping pulses passed by said plurality of gates are counted by said coordinate pulse counters.

10. A function tracer circuit as defined in claim 8 in which a plurality of storage devices (21,24), corresponding in number to the number of said variables, are provided for storing given information with respect to said variables for for a plurality of points of said function and are adapted to supply to the respective comparators (19,20) difference information in terms of the respective variables between said given information for two successive points of said function defining segment thereof and are further adapted to be advanced from one segment to the next of said function, and in which an additional scaler (28) is provided to which the output of said line segment gate is supplied as an input, said scaler being adapted to provide an output signal in response to the output of said line segment gate (23) only after a predetermined number of output signals of said line segment gate have been absorbed in said scaler, said predetermined number being the same as in the case of said scalers (26,27) respectively associated with said coordinate pulse counters (15,16), and in which means (29) for advancing said storage devices (21,24) as aforesaid.

11. A linear interpolator circuit comprising a function tracer circuit as defined in claim 10 and additional means for selectively supplying or emphasizing the output of said coordinate pulse counters existing at the time of each operation of said line segment gate.

* * * * *